(12) United States Patent
Murata et al.

(10) Patent No.: US 10,502,118 B2
(45) Date of Patent: Dec. 10, 2019

(54) EXHAUST HEAT RECOVERY DEVICE

(71) Applicant: TOYOTA JIDOSHA KABUSHIKI KAISHA, Toyota-shi, Aichi-ken (JP)

(72) Inventors: Toshio Murata, Toyota (JP); Tadashi Nakagawa, Miyoshi (JP); Kazunari Matsuura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/475,702

(22) Filed: Mar. 31, 2017

(65) Prior Publication Data

US 2017/0292429 A1    Oct. 12, 2017

(30) Foreign Application Priority Data

Apr. 11, 2016  (JP) ................................ 2016-078874
Feb. 3, 2017   (JP) ................................ 2017-018640

(51) Int. Cl.
 *F01N 5/02*     (2006.01)
 *F01N 13/18*    (2010.01)

(52) U.S. Cl.
 CPC ........... *F01N 5/02* (2013.01); *F01N 13/1855* (2013.01); *F01N 2240/02* (2013.01); *F01N 2410/00* (2013.01); *Y02T 10/16* (2013.01)

(58) Field of Classification Search
 CPC .... F01N 5/02; F01N 13/1855; F01N 2240/02; F01N 2410/00; Y02T 10/16
 USPC ........................................................ 60/320
 See application file for complete search history.

(56) References Cited

U.S. PATENT DOCUMENTS

| | | | | |
|---|---|---|---|---|
| 9,664,087 B2* | 5/2017 | Sloss | ................. | F01N 5/02 |
| 2009/0049832 A1* | 2/2009 | Hase | ................. | F01N 5/02 60/320 |
| 2011/0308502 A1* | 12/2011 | Shiraishi | ............. | F01D 17/105 123/559.1 |
| 2012/0017575 A1* | 1/2012 | Sloss | ................. | F01N 5/02 60/320 |
| 2013/0061584 A1* | 3/2013 | Gerges | ............. | F01N 5/02 60/320 |

(Continued)

FOREIGN PATENT DOCUMENTS

| | | |
|---|---|---|
| JP | S54-148920 A | 11/1979 |
| JP | S61-105753 U | 7/1986 |
| JP | 2006-077741 A | 3/2006 |

(Continued)

OTHER PUBLICATIONS

Jun. 25, 2019 Office Action issued in Japanese Patent Application No. 2017-018640.

*Primary Examiner* — Laert Dounis
*Assistant Examiner* — Kelsey L Stanek
(74) *Attorney, Agent, or Firm* — Oliff PLC

(57) ABSTRACT

An exhaust heat recovery device includes: a first pipe through which exhaust gas from an engine flows; a second pipe that communicates with the first pipe and bypasses the first pipe; a heat recovery unit that is disposed at an interior of the second pipe, and that exchanges heat between the exhaust gas and cooling water that circulates at an interior of the heat recovery unit, and that recovers heat of the exhaust gas; and a heat transfer suppressing mechanism that is provided at a portion connecting the first pipe with the second pipe, and that suppresses transfer of heat from the first pipe to the second pipe.

2 Claims, 7 Drawing Sheets

(56) References Cited

U.S. PATENT DOCUMENTS

| | | | | |
|---|---|---|---|---|
| 2014/0251579 | A1* | 9/2014 | Sloss | F01N 5/02 165/96 |
| 2016/0010531 | A1* | 1/2016 | Domínguez | F01N 3/043 60/320 |

FOREIGN PATENT DOCUMENTS

| | | |
|---|---|---|
| JP | 2009-023606 A | 2/2009 |
| JP | 2009-250107 A | 10/2009 |
| JP | 2010-144567 A | 7/2010 |
| JP | 2012-247132 A | 12/2012 |
| JP | 2014-526666 A | 10/2014 |
| KR | 2015-0121232 A | 10/2015 |

* cited by examiner

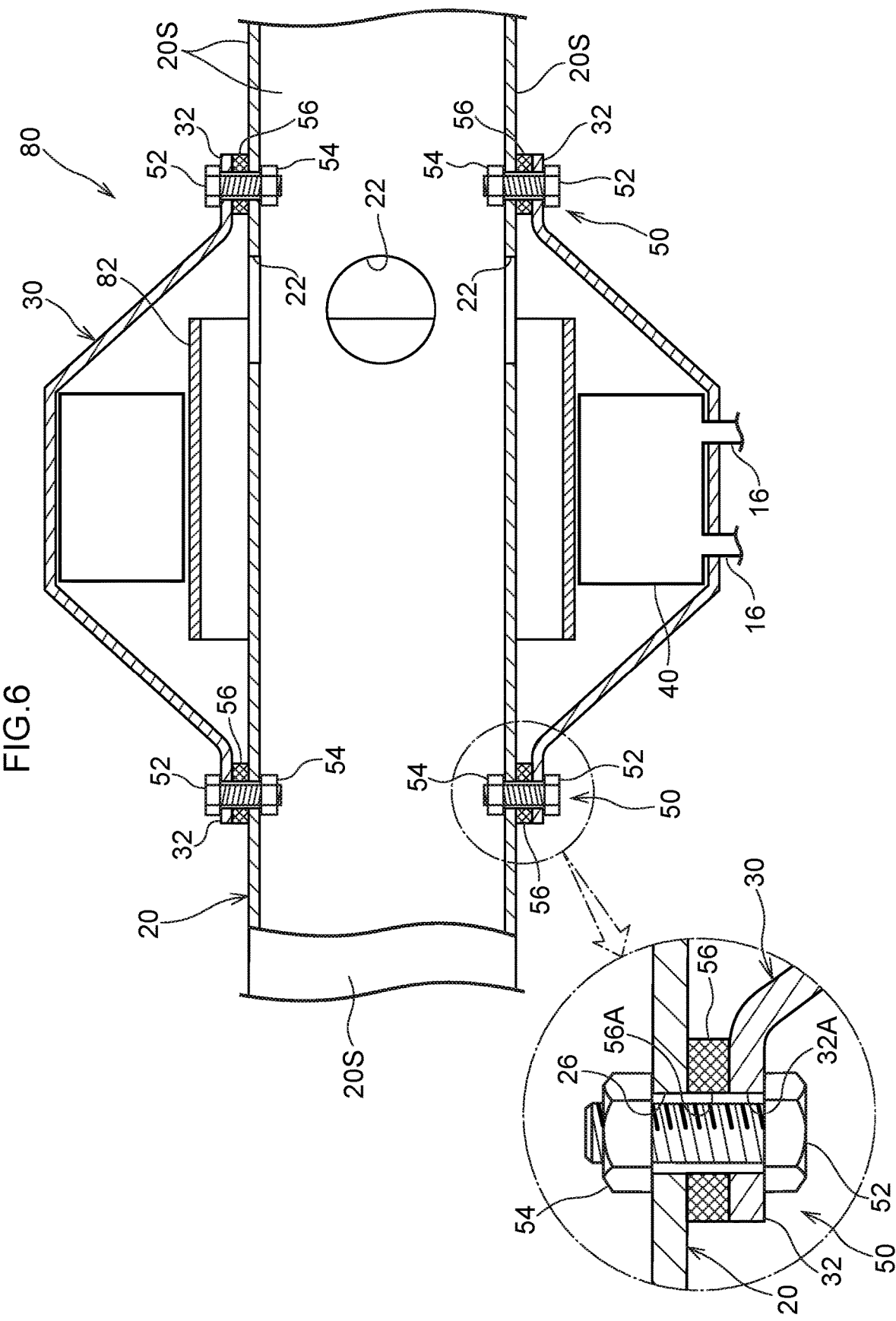

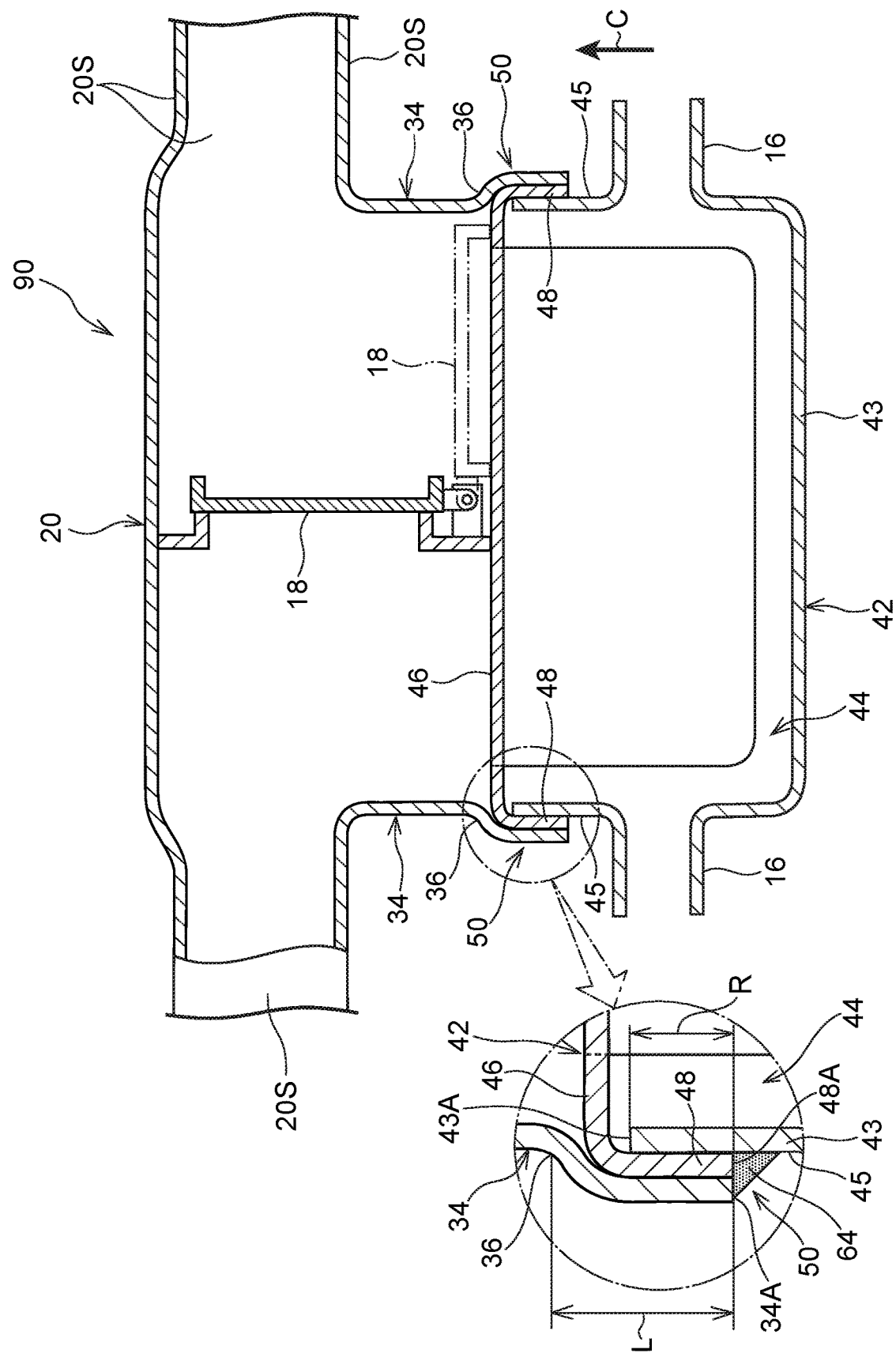

EXHAUST HEAT RECOVERY DEVICE

CROSS-REFERENCE TO RELATED APPLICATION

This application claims priority under 35 USC 119 from Japanese Patent Applications No. 2016-078874 filed Apr. 11, 2016 and No. 2017-018640 filed Feb. 3, 2017, the disclosures of which are incorporated by reference herein.

BACKGROUND

Technical Field

The present invention relates to an exhaust heat recovery device.

Related Art

The exhaust heat recovery device disclosed in Japanese Patent Application Laid-Open (JP-A) No. 2012-247132 is structured to include a first flow path (a first pipe) through which exhaust gas of an engine flows, a second flow path (a second pipe) that branches-off from the first flow path, and a heat recovery unit that is disposed within the second flow path. Further, the heat recovery unit has discharge holes for making it such that the amount of cooling water that flows at the upstream side of the heat recovery unit is greater than the amount of cooling water that flows at the downstream side of the heat recovery unit. Due thereto, there is a structure in which the cooling water within the heat recovery unit can be made to flow in accordance with the temperature gradient of the cooling water.

In the above-described exhaust heat recovery device, because the first flow path is heated by the exhaust gas that flows through the first flow path, the heat of the first flow path is transferred to the second flow path, and the temperature of the cooling water within the heat recovery unit rises. In particular, for example, at times when the engine is stopped or the like, because circulating of cooling water within the heat recovery unit is stopped, the cooling water stays within the heat recovery unit, and there is the possibility that the cooling water that is within the heat recovery unit will boil. In this case, there is the concern that abnormal sound that is caused by the cooling water boiling will arise at the heat recovery unit. Therefore, it is desirable for an exhaust heat recovery device to be structured so as to be able to suppress boiling of cooling water within the heat recovery unit.

SUMMARY

The present invention provides an exhaust heat recovery device that can suppress boiling of cooling water within a heat recovery unit.

An exhaust heat recovery device of a first aspect of the present invention includes: a first pipe through which exhaust gas from an engine flows; a second pipe that communicates with the first pipe and bypasses the first pipe; a heat recovery unit that is disposed at an interior of the second pipe, and that exchanges heat between the exhaust gas and cooling water that circulates at an interior of the heat recovery unit, and that recovers heat of the exhaust gas; and a heat transfer suppressing mechanism that is provided at a portion connecting the first pipe with the second pipe, and that suppresses transfer of heat from the first pipe to the second pipe.

In the exhaust heat recovery device of the above-described structure, the second pipe communicates with the first pipe through which exhaust gas from the engine flows, and the second pipe bypasses the first pipe. The heat recovery unit is disposed at the interior of the second pipe. Due thereto, heat exchange is carried out between the exhaust gas and the cooling water that circulates through the heat recovery unit interior, and heat of the exhaust gas can be recovered by the heat recovery unit.

Because the exhaust gas of the engine flows through the first pipe, the first pipe is heated by the exhaust gas. Therefore, when heat of the first pipe is transferred as is to the second pipe that is connected to the first pipe, the temperature of the cooling water that is within the heat recovery unit rises due to the heat that has been transferred to the second pipe.

Here, the heat transfer suppressing mechanism is provided at the portion connecting the first pipe with the second pipe, and transfer of heat from the first pipe to the second pipe is suppressed by the heat transfer suppressing mechanism. Due thereto, an excessive rise in temperature of the second pipe due to the heat of the first pipe is suppressed, and therefore, boiling of the cooling water that is within the heat recovery unit can be suppressed.

In an exhaust heat recovery device of a second aspect of the present invention, in the first aspect, the heat transfer suppressing mechanism has a heat insulating material, and the second pipe is connected to the first pipe via the heat insulating material.

In the exhaust heat recovery device of the above-described structure, the second pipe is connected to the first pipe via the heat insulating material of the heat transfer suppressing mechanism. Therefore, heat of the first pipe being transferred to the second pipe can be suppressed by the heat transfer material. Accordingly, boiling of cooling water that is within the heat recovery unit can be suppressed by a simple structure.

In an exhaust heat recovery device of a third aspect of the present invention, in the first aspect or the second aspect, a communicating hole, that communicates an interior of the first pipe with the interior of the second pipe, is formed at the portion connecting the first pipe with the second pipe; and the heat transfer suppressing mechanism includes: a first flange that is formed at a peripheral edge portion of the communicating hole of the first pipe and bends-back toward an outer side of the communicating hole at an outer side of the first pipe, and a second flange that is formed at the portion connecting the first pipe with the second pipe and that is connected to the first flange.

In the exhaust heat recovery device of the above-described structure, a communicating hole, that communicates the interior of the first pipe with the interior of the second pipe, is formed in the portion connected to the first pipe. The first flange that structures the heat transfer suppressing mechanism is formed at the peripheral edge portion of this communicating hole. The second flange that structures the heat transfer suppressing mechanism is formed at the portion connected to the second pipe. The first flange bends-back toward the outer side of the communicating hole at the outer side of the first pipe, and the second flange is connected to the first flange. Therefore, the heat transfer path from the first pipe to the second pipe can be set to be long by the first flange and the second flange. Due thereto, boiling of cooling water that is within the heat recovery unit can be suppressed effectively.

In an exhaust heat recovery device of a fourth aspect of the present invention, in any of the first through third aspects, the heat transfer suppressing mechanism includes bolts and nuts, and the first pipe and the second pipe are connected by being fastened together by the bolts and the nuts.

In the exhaust heat recovery device of the above-described structure, because the first pipe and the second pipe are fastened and connected by the bolts and the nuts of the heat transfer suppressing mechanism, boiling of cooling water that is within the heat recovery unit can be suppressed by an even simpler structure. Namely, in a case in which the second pipe is directly fastened to the first pipe by bolts and nuts, there is a tight fit of the fastened regions at the portion connecting the first pipe with the second pipe, but the fit is relatively less tight at regions that are not fastened at the portion connecting the first pipe with the second pipe. Therefore, the heat transfer ability of the regions that are not fastened at the portion connecting the first pipe with the second pipe is relatively low. Due thereto, heat of the first pipe being transferred to the second pipe can be suppressed at the regions that are not fastened at the portion connecting the first pipe with the second pipe. Accordingly, an excessive rise in temperature of the second pipe due to heat of the first pipe is suppressed, and therefore, boiling of cooling water that is within the heat recovery unit can be suppressed by an even simpler structure.

In an exhaust heat recovery device of a fifth aspect of the present invention, in any of the first through fourth aspects, an upstream side end portion and a downstream side end portion of the second pipe are connected to the first pipe.

In the exhaust heat recovery device of the above-described structure, the upstream side end portion and the downstream side end portion of the second pipe are connected to the first pipe, and therefore, there can be made to be a structure in which the second pipe is connected in parallel to the first pipe. Due thereto, as compared with a structure in which the second pipe and the heat recovery unit are disposed in annular forms at the outer side of the first pipe, it can be made difficult for the heat recovery unit to be affected by radiant heat of the first pipe. Accordingly, there can be made to be an arranged structure that is effective with respect to suppressing boiling of the cooling water that is within the heat recovery unit.

In an exhaust heat recovery device of a sixth aspect of the present invention, in the fifth aspect, the heat transfer suppressing mechanism is provided respectively at a portion of the first pipe, which is connected to the upstream side end portion and at another portion of the first pipe, which is connected to the downstream side end portion.

In the exhaust heat recovery device of the above-described structure, heat of the first pipe being transferred to the heat recovery unit from the upstream side and the downstream side of the second pipe is suppressed. Due thereto, boiling of the cooling water that is within the heat recovery unit can be suppressed even more.

An exhaust heat recovery device of a seventh aspect of the present invention includes: a first pipe through which exhaust gas from an engine flows; a second pipe that is branched-off from the first pipe and is open; a heat recovery unit that has a header plate, and is mounted to an opening of the second pipe from the header plate side and closes-off the opening, and exchanges heat between the exhaust gas and cooling water that circulates at an interior of the heat recovery unit, and that recovers heat of the exhaust gas; and a heat transfer suppressing mechanism that is provided at a portion connecting the second pipe with the heat recovery unit, and that suppresses transfer of heat from the second pipe to the heat recovery unit, wherein the heat recovery unit has, at an outer peripheral portion thereof, a flow path through which cooling water passes, and the heat transfer suppressing mechanism is structured to include an outer peripheral portion of the header plate that, together with an opening end portion of the second pipe, is welded to outer wall surfaces that structure the flow path.

In the exhaust heat recovery device of the above-described structure, the heat recovery unit is mounted to the second pipe, which is open and is branched-off from the first pipe through which exhaust gas from the engine flows, so as to close-off the opening of the second pipe. Due thereto, heat exchange is carried out between the exhaust gas and the cooling water that circulates within the heat recovery unit, and heat of the exhaust gas can be recovered by the heat recovery unit.

Because the exhaust gas of the engine flows through the first pipe and the second pipe, the first pipe and the second pipe are heated by the exhaust gas. Therefore, when the heat of the first pipe and the second pipe is transmitted as is to the heat recovery unit that is connected to the second pipe, the temperature of the cooling water that is within the heat recovery unit rises due to this heat.

Here, the heat transfer suppressing mechanism that suppresses transfer of heat from the second pipe to the heat recovery unit is provided at the portion connecting the second pipe with the heat recovery unit. Namely, a flow path through which cooling water flows is provided at the outer peripheral portion of the heat recovery unit, and the outer peripheral portion of the header plate is welded, together with the opening end portion of the second pipe, to the outer wall surfaces that structure this flow path.

Accordingly, the heat transfer path from this welded portion to the cooling water at the heat recovery unit interior can be set to be long, and an excessive rise in temperature of the cooling water due to the heat of the second pipe can be suppressed. Therefore, boiling of the cooling water can be suppressed. Further, because the temperature immediately after welding of this welded portion can be reduced by the cooling water, a decrease in the joining strength at this welded portion can be suppressed.

In an exhaust heat recovery device of an eighth aspect of the present invention, in the seventh aspect, the outer peripheral portion of the header plate extends toward an upstream side in a direction of mounting the heat recovery unit to the opening of the second pipe.

In the exhaust heat recovery device of the above-described structure, the outer peripheral portion of the header plate extends toward the upstream side in the direction of mounting the heat recovery unit to the opening of the second pipe. Therefore, as compared with a structure in which the outer peripheral portion of the header plate does not extend toward the upstream side in the direction of mounting the heat recovery unit to the opening of the second pipe, the heat transfer path from the welded portion to the cooling water can efficiently be set to be long, and boiling of the cooling water that is within the heat recovery unit can be suppressed effectively.

BRIEF DESCRIPTION OF THE DRAWINGS

Exemplary embodiments of the present invention will be described in detail based on the following figures, wherein:

FIG. 6 is a cross-sectional view showing an example in which the heat transfer suppressing mechanism shown in FIG. 1 is applied to another exhaust heat recovery device.

FIG. 7 is a cross-sectional view showing main portions of an exhaust heat recovery device relating to a fourth embodiment.

DETAILED DESCRIPTION

First Embodiment

An exhaust heat recovery device 10 relating to a first embodiment is described hereinafter by using FIG. 1 and FIG. 2. Then, a heat transfer suppressing mechanism 50 that is applied to the exhaust heat recovery device 10 is described. Note that, hereinafter, there are cases in which the upstream side and the downstream side in the direction of flowing of exhaust gas are simply called the "upstream side" and the "downstream side.

(Regarding the Exhaust Heat Recovery Device 10)

Figure 2:
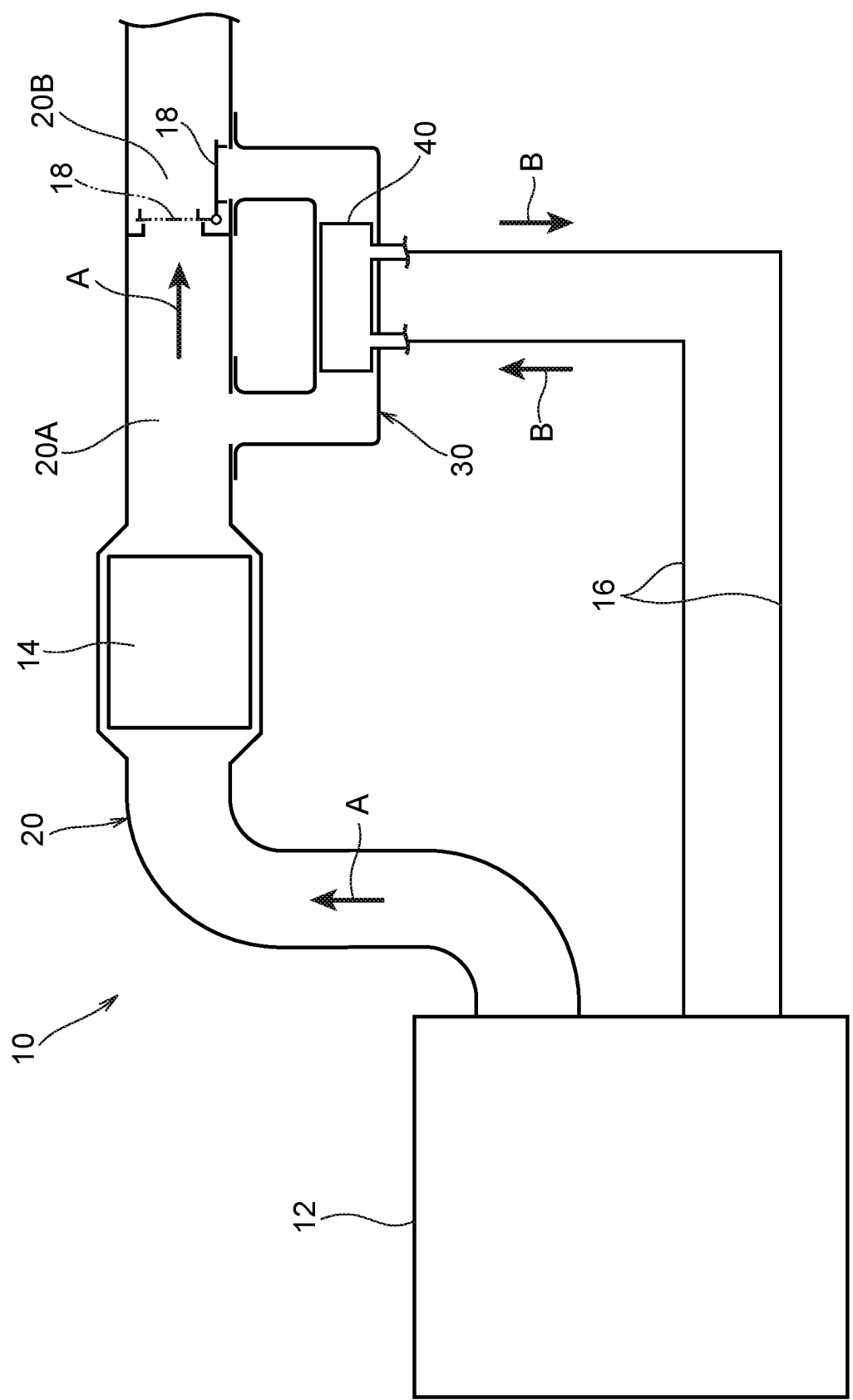
FIG. 2 is an explanatory drawing for explaining the overall structure of the exhaust heat recovery device shown in FIG. 1.

As shown in FIG. 2, the exhaust heat recovery device 10 is a device that recovers, by heat exchange with cooling water that is within a heat recovery unit 40 that is described later, heat of exhaust gas of an engine 12 of an automobile, and uses the heat in promoting warming-up of the engine 12 and the like.

Figure 1:
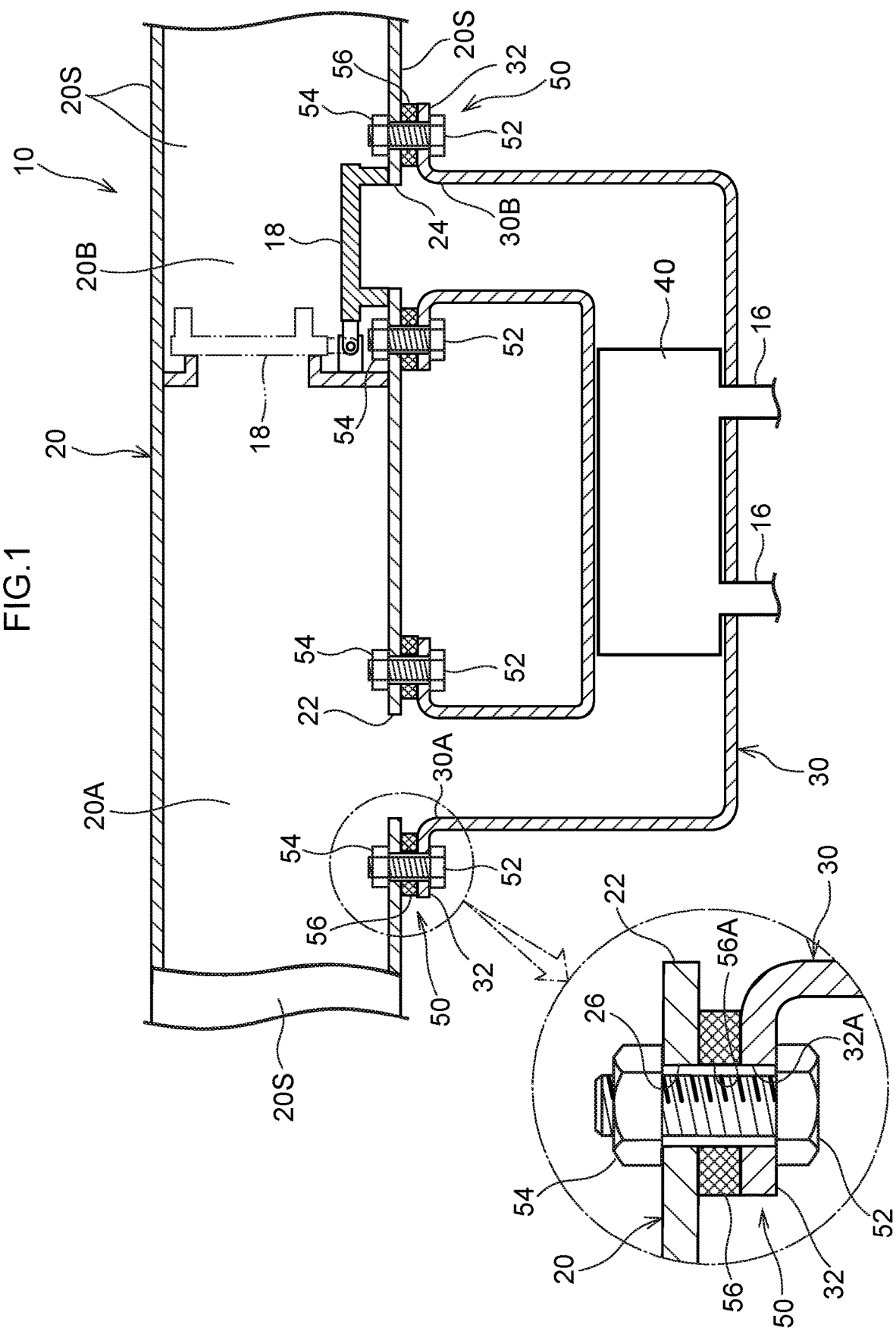
FIG. 1 is a cross-sectional view showing main portions of an exhaust heat recovery device relating to a first embodiment.

As shown in FIG. 1, the exhaust heat recovery device 10 has a first pipe 20 that is pipe-shaped. In the present embodiment, the first pipe 20 is formed in the shape of a pipe by joining, by welding or the like, members that have been divided (e.g., divided in two) in the peripheral direction of the first pipe 20. Moreover, the outer shape of the first pipe 20 may be circular or may be rectangular, and, in the present embodiment, the first pipe 20 is formed in the shape of a rectangular pipe. Therefore, the first pipe 20 is structured to include four side walls 20S. Further, as shown in FIG. 2, the first pipe 20 is connected to the engine 12, and structures an exhaust path of the exhaust gas that flows-out from the engine 12. Note that, in FIG. 2, the flow of the exhaust gas within the first pipe 20 is illustrated by arrows A. A catalytic converter 14 is provided at the upstream side of this first pipe 20, and the catalytic converter 14 is structured so as to purify, by a catalyst that is contained therein, the exhaust gas that passes therethrough.

Further, a second pipe 30 that is pipe-shaped is connected to the first pipe 20 at a branching portion 20A that is at the downstream side with respect to the catalytic converter 14. Namely, the second pipe 30 is branched-off from the first pipe 20 at the branching portion 20A, and the second pipe 30 is connected to the first pipe 20 at a merging portion 20B that is at the downstream side of the branching portion 20A on the first pipe 20. Further, the second pipe 30 is connected to the first pipe 20 in parallel, and structures an exhaust path that bypasses the first pipe 20. Note that, as shown in FIG. 1, a branching hole 22, that serves as a "communicating hole" that communicates the interior of the first pipe 20 with the interior of the second pipe 30, is formed at the branching portion 20A of the first pipe 20 in one of the side walls 20S among the four side walls 20S. Further, a merging hole 24, that serves as a "communicating hole" that communicates the interior of the first pipe 20 with the interior of the second pipe 30, is formed at the merging portion 20B of the first pipe 20.

As shown in FIG. 2, the heat recovery unit 40 is provided within the second pipe 30 at an intermediate position of the second pipe 30. Cooling water circulating paths 16, that circulate cooling water between the heat recovery unit 40 and the engine 12, are connected to the heat recovery unit 40. Further, cooling water is circulated through the interiors of the cooling water circulating paths 16 by operation of an unillustrated water pump that is driven by power of the engine 12 (in FIG. 2, the flow of the cooling water is shown by arrows B). Due thereto, the heat recovery unit 40 is structured so as to recover heat of the exhaust gas into the cooling water by heat exchange between the exhaust gas and the cooling water, and utilizes that heat in promoting of warming-up of the engine 12 and the like.

Note that this is a structure in which, for example, immediately after start-up of the engine 12, or when the ignition switch of the automobile is turned off and the engine 12 is stopped, cooling water does not circulate in the cooling water circulating paths 16. Further, this is a structure in which, in a case in which the exhaust heat recovery device 10 is applied to an automobile such as a hybrid car for example, cooling water does not circulate in the cooling water circulating paths 16 when the engine 12 is stopped due to intermittent operation of the engine 12.

Further, a flow path switching valve 18 (an element that can be interpreted in the broad sense as a "flow path switching valve"), that is for opening and closing the flow path within the first pipe 20, is provided within the first pipe 20 between the branching portion 20A and the merging portion 20B. This is a structure in which the flow path switching valve 18 is controlled by an unillustrated ECU (control device). Further, due to the flow path switching valve 18 operating by control of the ECU, the flow path between the branching portion 20A and the merging portion 20B is opened and closed by the flow path switching valve 18. This is a structure in which, for example, in a case of promoting warming-up of the engine 12, or the like, the flow path between the branching portion 20A and the merging portion 20B is closed by the flow path switching valve 18, and there is an exhaust heat recovery mode in which heat exchange is carried out between the exhaust gas and the cooling water at the heat recovery unit 40 (refer to the position of the flow path switching valve 18 that is shown by the two-dot chain line in FIG. 1 and FIG. 2). On other hand, this is a structure in which, at times other than that of the exhaust heat recovery mode, the flow path between the branching portion 20A and the merging portion 20B is opened by the flow path switching valve 18, and there is a normal mode in which the exhaust gas flows through this path (refer to the position of the flow path switching valve 18 that is shown by the solid line in FIG. 1 and FIG. 2).

(Regarding the Heat Transfer Suppressing Mechanism 50)

The heat transfer suppressing mechanism 50 that is a main portion of the present invention is described next. As shown in FIG. 1, the heat transfer suppressing mechanisms 50 are applied to the portions connecting the first pipe 20 with the second pipe 30. At the portions connecting the first pipe 20 with the second pipe 30, heat of the first pipe 20 being transferred to the second pipe 30 is suppressed by the heat transfer suppressing mechanisms 50. The heat transfer suppressing mechanism 50 is structured to include a second pipe flange 32 that serves as a "second flange" that is formed at the second pipe 30, and plural bolts 52 and weld nuts 54 that serve as "nuts" for fastening and fixing the second pipe 30 to the first pipe 20, and a heat insulating material 56.

The second pipe flanges 32 are formed respectively at an upstream side end portion 30A and a downstream side end portion 30B of the second pipe 30. Concretely, the second pipe flanges 32 are bent substantially orthogonally toward the outer sides of the second pipe 30, and are formed so as to extend over the entire periphery in the peripheral direction of the second pipe 30. Further, the second pipe flange 32 that is formed at the upstream side end portion 30A of the second pipe 30 is disposed so as to face the peripheral edge portion of the branching hole 22 at the first pipe 20, at the outer side of the first pipe 20. The second pipe flange 32, that is formed at the downstream side end portion 30B of the second pipe 30, is disposed so as to face the peripheral edge portion of the merging hole 24 at the first pipe 20, at the outer side of the first pipe 20.

At the interior of the first pipe 20, the weld nuts 54 are provided at the peripheral edge portion of the branching hole 22 at the first pipe 20 with the plate thickness direction of the side wall 20S being the axial direction thereof, and are disposed at a predetermined interval in the peripheral direction of the branching hole 22. Further, at the interior of the first pipe 20, the weld nuts 54 are provided at the peripheral edge portion of the merging hole 24 at the first pipe 20 with the plate thickness direction of the side wall 20S being the axial direction thereof, and are disposed at a predetermined interval in the peripheral direction of the merging hole 24. Further, insert-through holes 26 are formed so as to pass-through the first tube 20 at positions corresponding to the weld nuts 54. Moreover, insert-through holes 32A are formed so as to pass-through the above-described second pipe flanges 32 as well at positions corresponding to the weld nuts 54.

The heat insulating materials 56 are structured of ceramic fibers or glass wool or the like, and are formed in the shapes of frames in correspondence with the shapes of the second pipe flanges 32 of the second pipe 30. Further, the heat insulating materials 56 are disposed between the peripheral edge portion of the branching hole 22 at the first pipe 20 and the second pipe flange 32, and between the peripheral edge portion of the merging hole 24 at the first pipe 20 and the second pipe flange 32, respectively. Namely, this is a structure in which the second pipe flanges 32 are connected to the first pipe 20 via the heat insulating materials 56. Further, insert-through holes 56A are formed so as to pass-through the heat insulating materials 56 at positions corresponding to the weld nuts 54. The bolts 52 are, from the outer side of the first pipe 20, inserted-through the interiors of the insert-through holes 32A of the second pipe flanges 32, the interiors of the insert-through holes 56A of the heat insulating materials 56, and the interiors of the insert-through holes 26 of the first pipe 20, and are screwed-together with the weld nuts 54. Due thereto, the second pipe flanges 32 are fastened to the first pipe 20 via the heat insulating materials 56, and the upstream side end portion 30A and the downstream side end portion 30B of the second pipe 30 are connected to the first pipe 20.

Operation and effects of the present embodiment are described next.

In the exhaust heat recovery device 10 that is structured as described above, when the flow path switching valve 18 closes the flow path between the branching portion 20A and the merging portion 20B by control of the ECU, exhaust gas flows from the branching hole 22 of the first pipe 20 into the second pipe 30. Further, the heat of the exhaust gas, that has flowed into the second pipe 30, is involved in heat exchange with the cooling water that is within the heat recovery unit 40. Due thereto, the heat of the exhaust gas is recovered by the heat recovery unit 40.

Because the exhaust gas of the engine 12 is flowing through the first pipe 20, the first pipe 20 is heated by the exhaust gas. Further, when the heat of the first pipe 20 is transferred as is to the second pipe 30 that is connected to the first pipe 20, the cooling water that is within the heat recovery unit 40 that is provided within the second pipe 30 is warmed by this heat, and the temperature of the cooling water that is within the heat recovery unit 40 rises. At this time, if the cooling water that is within the heat recovery unit 40 were to boil, there would be the concern that abnormal sound due to the cooling water boiling would arise at the heat recovery unit 40.

Here, at the exhaust heat recovery device 10, the heat transfer suppressing mechanisms 50 are provided at the portions connecting the first pipe 20 with the second pipe 30. The heat transfer suppressing mechanisms 50 have the heat insulating materials 56, and the heat insulating materials 56 are interposed between the first pipe 20 and the second pipe flanges 32 that are formed at the upstream side end portion 30A and the downstream side end portion 30B of the second pipe 30. Therefore, at the portions connecting the first pipe 20 with the second pipe 30, transfer of the heat of the first pipe 20 to the second pipe 30 can be suppressed by the heat insulating materials 56. Due thereto, an excessive rise in temperature of the second pipe 30 due to the heat of the first pipe 20 can be suppressed, and boiling of the cooling water that is within the heat recovery unit 40 can be suppressed. As a result, the occurrence of abnormal sound of the heat recovery unit 40, that is due to the cooling water boiling, can be suppressed.

In particular, in a case in which circulating of the cooling water at the cooling water circulating paths 16 is stopped (after the engine 12 is stopped, or at the time of intermittent operation of the engine 12 in a hybrid car, or the like), the cooling water stays within the heat recovery unit 40. Therefore, in this case, there is the tendency for the temperature of the cooling water that is within the heat recovery unit 40 to easily rise due to the heat that is transferred from the first pipe 20 to the second pipe 30. To address this, in the exhaust heat recovery device 10 of the present embodiment, as described above, the heat insulating materials 56 of the heat transfer suppressing mechanisms 50 are provided at the portions connecting the first pipe 20 with the second pipe 30. Therefore, the heat of the first pipe 20 being transferred to the second pipe 30 can be suppressed, and an excessive rise in temperature of the cooling water that stays within the heat recovery unit 40 can be suppressed. Accordingly, for cases in which circulation of the cooling water is stopped, boiling of the cooling water that is within the heat recovery unit 40 can be suppressed effectively.

Further, as described above, at the heat transfer suppressing mechanisms 50, due to the heat insulating materials 56 being interposed between the first pipe 20 and the second pipe flanges 32 of the second pipe 30, transfer of heat at the portions connecting the first pipe 20 with the second pipe 30 is suppressed. Therefore, boiling of the cooling water that is within the heat recovery unit 40 can be suppressed by a simple structure.

Further, at the exhaust heat recovery device 10, the second pipe 30 is disposed in parallel to the first pipe 20, and the heat recovery unit 40 is provided at the interior of the second pipe 30. Namely, the exhaust heat recovery device 10 is a so-called parallel structure in which the heat recovery unit 40 is disposed parallel to the first pipe 20. Therefore, the effects of radiant heat of the first pipe 20 on the heat recovery unit 40 can be suppressed, as compared with an exhaust heat recovery device that has a coaxial structure in which the second pipe and the heat recovery unit are disposed in annular forms at the outer side of the first pipe 20. Due thereto, the exhaust heat recovery device 10 can be made to be an arranged structure that is effective with respect to the suppression of boiling of cooling water that is within the heat recovery unit 40.

Moreover, at the exhaust heat recovery device 10, the heat transfer suppressing mechanisms 50 are applied respectively to the portion of the first pipe 20, which is connected to the upstream side end portion 30A of the second pipe 30, and to the portion of the first pipe 20, which is connected to the downstream side end portion 30B of the second pipe 30. Therefore, the heat of the first pipe 20 being transferred to the heat recovery unit 40 from the upstream side and the downstream side of the second pipe 30 can be suppressed, as compared with a case in which the heat transfer suppressing mechanism 50 is applied to either one of the portion of the first pipe 20, which is connected to the upstream side end portion 30A of the second pipe 30, and the portion of the first pipe 20, which is connected to the downstream side end portion 30B of the second pipe 30. Due thereto, boiling of the cooling water that is within the heat recovery unit 40 can be suppressed even more.

(Modified Example of Heat Transfer Suppressing Mechanism 50 of First Embodiment)

Figure 3:
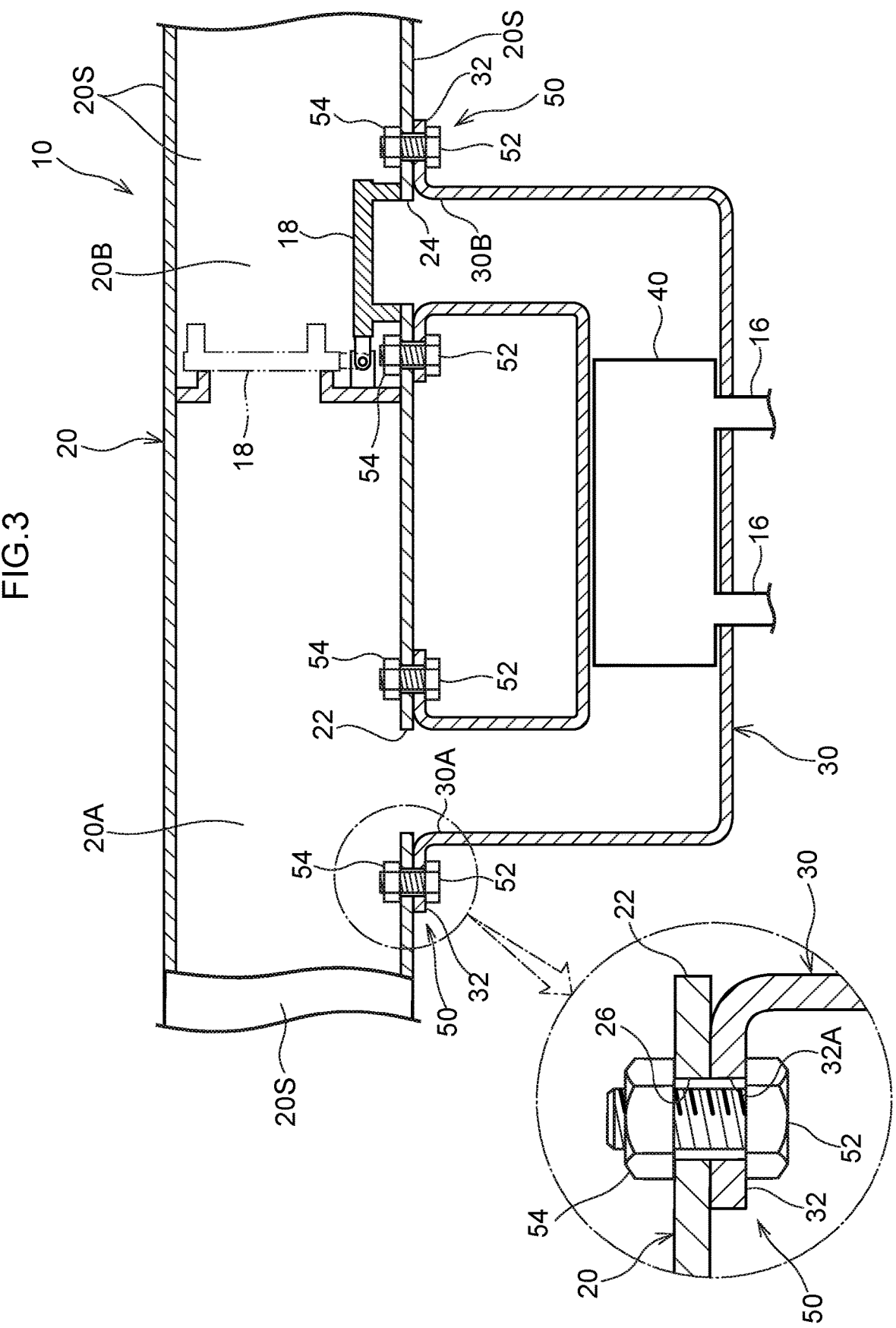
FIG. 3 is a cross-sectional view that corresponds to FIG. 1 and shows a modified example of a heat transfer suppressing mechanism shown in FIG. 1.

In the above-described first embodiment, the heat transfer suppressing mechanism 50 is structured to include the heat insulating material 56. However, in the present modified example, as shown in FIG. 3, the heat insulating material 56 is omitted from the heat transfer suppressing mechanism 50. Namely, in the present modified example, the second pipe flanges 32 of the second pipe 30 are directly fastened and fixed to the first pipe 20 by the bolts 52 and weld nuts 54, and the second pipe 30 is connected to the first pipe 20. Further, from the standpoint of suppressing boiling of the cooling water within the heat recovery unit 40, it is preferable that the second pipe flanges 32 of the second pipe 30 be connected to the first pipe 20 via the heat insulating materials 56 as in the first embodiment. However, it has been confirmed that, even if the heat insulating materials 56 are omitted from the heat transfer suppressing mechanisms 50, such a structure can contribute to the suppressing of boiling of the cooling water that is within the heat recovery unit 40. This point is described hereinafter.

In a case in which the second pipe flanges 32 of the second pipe 30 are directly fastened and fixed to the first pipe 20 by the bolts 52 and the weld nuts 54 as in the present modified example, the fastened regions of the second pipe flanges 32 with the first pipe 20 are substantially fit tightly to the first pipe 20 locally. Namely, there is a tight fit of the fastened regions of the second pipe flanges 32 and the first pipe 20, but, at the regions where the second pipe flanges 32 and the first pipe 20 are not fastened together, the fit is relatively less tight. In actuality, it is difficult to make the entire facing surfaces of the second pipe flanges 32, which surfaces face the first pipe 20, abut the outer peripheral surface of the first pipe 20 due to, for example, dimensional accuracy of the parts and the like, and it is thought that the relatively less tight fit at the non-fastened regions is due to the fact that, thereat, slight gaps are formed between the second pipe flanges 32 and the outer peripheral surface of the first pipe 20.

Therefore, in the present modified example, the heat transfer ability of the regions where the second pipe flanges 32 and the first pipe 20 are not fastened together is relatively low, and this works such that the heat of the first pipe 20 is mainly transferred to the second pipe 30 via the fastened regions that are fastened by the bolts 52 and the weld nuts 54. Conversely, at the regions where the second pipe flanges 32 and the first pipe 20 are not fastened together, heat of the first pipe 20 being transferred to the second pipe 30 can be suppressed. Due thereto, there can be a structure in which the resistance of heat transfer at the portions connecting the first pipe 20 with the second pipe 30 is relatively high. As a result, even if the second pipe flanges 32 of the second pipe 30 are directly fastened and fixed to the first pipe 20 by the bolts 52 and the weld nuts 54, boiling of cooling water that is within the heat recovery unit 40 can be suppressed. Accordingly, boiling of cooling water that is within the heat recovery unit 40 can be suppressed by a more simple structure.

Second Embodiment

Figure 4:
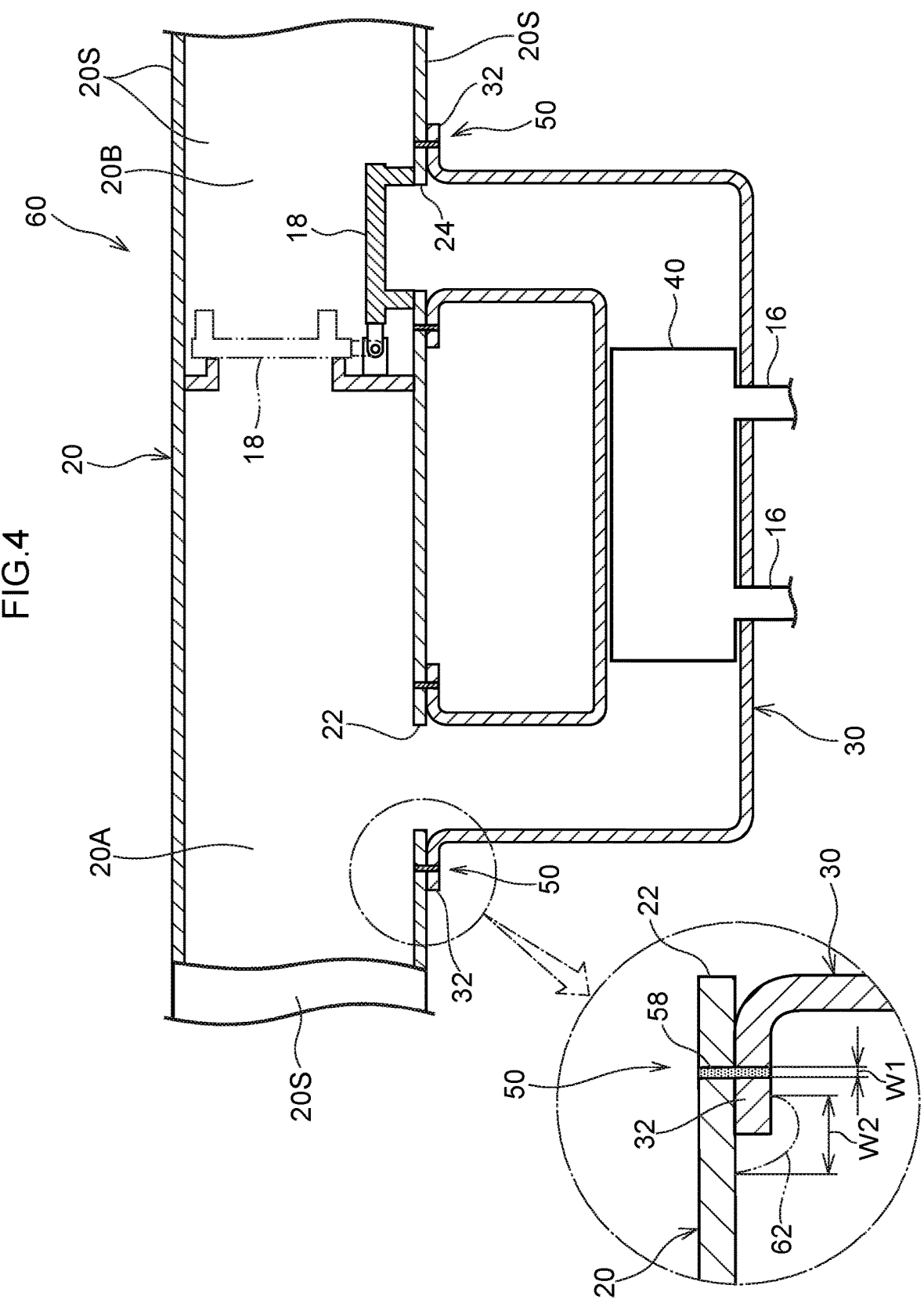
FIG. 4 is a cross-sectional view showing main portions of an exhaust heat recovery device relating to a second embodiment.

An exhaust heat recovery device 60 of a second embodiment is described hereinafter by using FIG. 4. The exhaust heat recovery device 60 of the second embodiment is structured similarly to the exhaust heat recovery device 10 of the first embodiment, except for the heat transfer suppressing mechanisms 50. The heat transfer suppressing mechanisms 50 of the exhaust heat recovery device 60 are described hereinafter. Note that, in FIG. 4, parts that are structured similarly to the exhaust heat recovery device 10 of the first embodiment are denoted by the same reference numerals.

The heat insulating material 56, the bolt 52 and the weld nut 54 are omitted from the heat transfer suppressing mechanism 50 of the exhaust heat recovery device 60, and the second pipe flange 32 of the second pipe 30 is directly joined to the first pipe 20 by laser welding. Note that, in FIG. 4, in order to make it easy to understand welded width W1 of a welded portion 58 of the second pipe flange 32 and the first pipe 20 that are joined by laser welding, for convenience, the welded portion 58 is shown schematically by dots that are drawn continuously in the plate thickness directions of the first pipe 20 and the second pipe flange 32. Further, the welded portion 58 is formed over the entire periphery in the peripheral direction of the second pipe flange 32.

At an exhaust heat recovery device, generally, there is a structure in which a second pipe is joined to a first pipe by arc welding, and the both are connected together (hereinafter, this device is called the exhaust heat recovery device of a comparative example). For example, as at a welded portion 62 that is shown by the two-dot chain line in the enlarged drawing of FIG. 4, in the comparative example, the second pipe flange 32 of the second pipe 30 is joined to the first pipe 20 by the welded portion 62 that is formed by arc welding at the entire periphery of the second pipe flange 32. Further, in the welding by arc welding, generally, there is the tendency for welded width W2 of the welded portion 62 to become relatively wide (e.g., the welded width W2 of the welded portion 62 becomes greater than or equal to approximately 5 mm). Therefore, in the comparative example, this works such that the heat of the first pipe 20 is transferred, via the welded portions 62 that have relatively wide welded widths, to the second pipe 30 from the entire peripheries of the second pipe flanges 32 of the second pipe 30.

In contrast, in the second embodiment, the second pipe flanges 32 are joined to the first pipe 20 by the welded portions 58 over the entire peripheries in the peripheral directions of the second pipe flanges 32, but heat of the first pipe 20 being transferred to the second pipe 30 can be suppressed as compared with the above-described comparative example. Namely, because the welded portions 58 are formed by laser welding, the welded width W1 of the welded portions 58 can be made to be narrower than the welded width W2 of the welded portions 62 of the above-described comparative example (e.g., the welded width W1 of the welded portions 58 can be made to be around 1 mm). Therefore, as compared with the above-described comparative example, the resistance of heat transfer at the portions connecting the first pipe 20 with the second pipe 30 can be made to be high (the heat transfer ability can be made to be low). Therefore, in the second embodiment, it is difficult for the heat of the first pipe 20 to be transferred to the second pipe 30, as compared with the above-described comparative example. Accordingly, in the second embodiment as well, boiling of cooling water that is within the heat recovery unit 40 can be suppressed.

Third Embodiment

Figure 5:
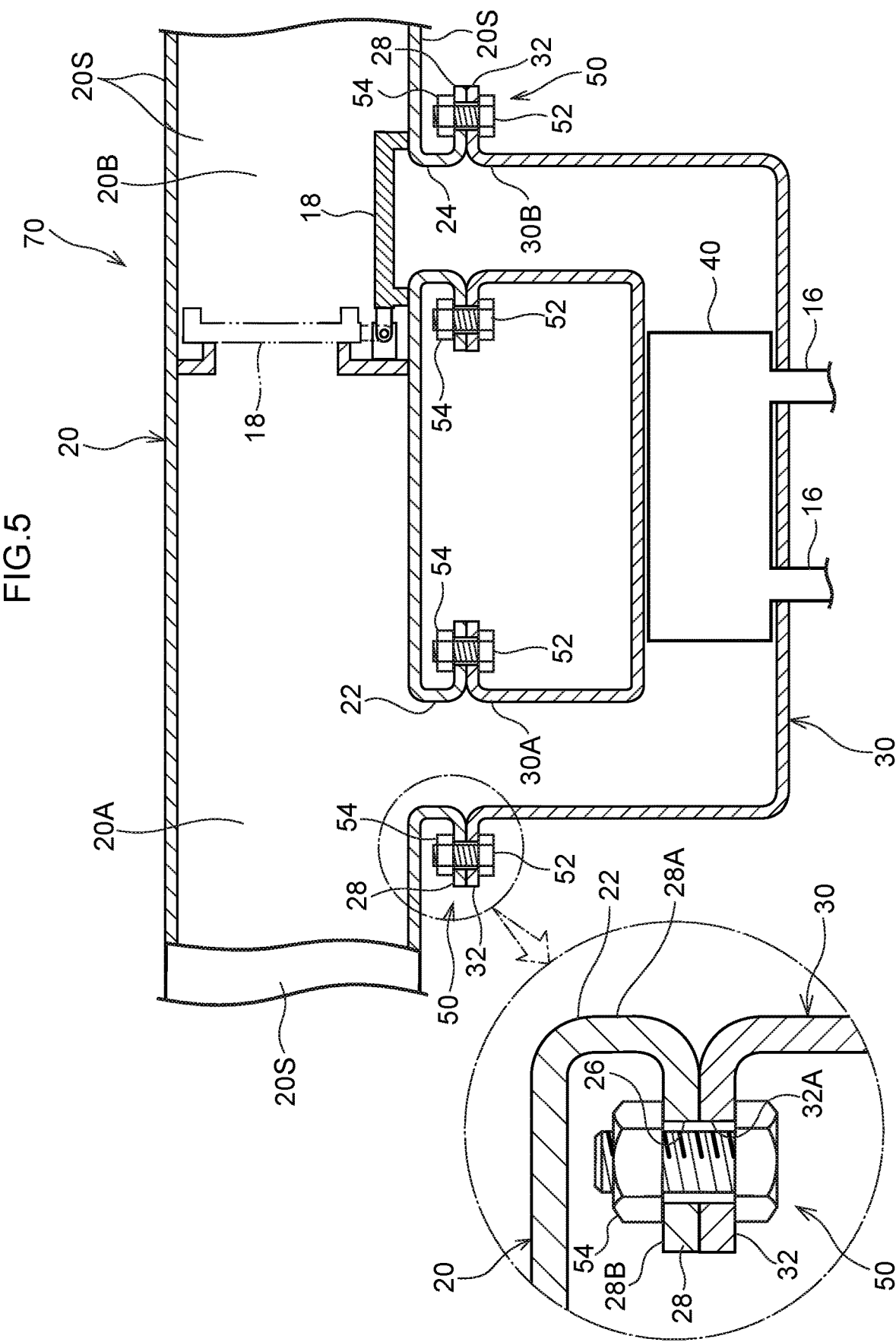
FIG. 5 is a cross-sectional view showing main portions of an exhaust heat recovery device relating to a third embodiment.

An exhaust heat recovery device 70 of a third embodiment is described hereinafter by using FIG. 5. The exhaust heat recovery device 70 of the third embodiment is structured similarly to the exhaust heat recovery device 10 of the first embodiment, except for the heat transfer suppressing mechanisms 50. The heat transfer suppressing mechanisms 50 of the exhaust heat recovery device 70 are described hereinafter. Note that, in FIG. 5, parts that are structured similarly to the exhaust heat recovery device 10 of the first embodiment are denoted by the same reference numerals.

The heat insulating material 56 is omitted from the heat transfer suppressing mechanism 50 of the exhaust heat recovery device 70. Further, the heat transfer suppressing mechanisms 50 of the exhaust heat recovery device 70 have first pipe flanges 28 that serve as "first flanges" and that are formed at the first pipe 20. The first pipe flanges 28 are formed respectively at the peripheral edge portions of the branching hole 22 and the merging hole 24 of the first pipe 20. Further, the first pipe flange 28 that is formed at the peripheral edge portion of the branching hole 22 and the first pipe flange 28 that is formed at the peripheral edge portion of the merging hole 24 are structured similarly. Therefore, in the following explanation, the first pipe flange 28 that is formed at the peripheral edge portion of the branching hole 22 is described, and description of the first pipe flange 28 that is formed at the peripheral edge portion of the merging hole 24 is omitted.

The first pipe flange 28 is bent so as to be bent-back toward the outer side of the branching hole 22 from the peripheral edge portion of the branching hole 22, at the outer side of the first pipe 20. Concretely, the first pipe flange 28 is structured to include a base portion 28A that is bent substantially orthogonally toward the outer side of the first pipe 20 from the peripheral edge portion of the branching hole 22, and a connecting flange portion 28B that extends-out toward the outer side of the branching hole 22 from the distal end portion of the base portion 28A. Further, the first pipe flange 28 is formed over the entire periphery in the peripheral direction of the branching hole 22. Moreover, the connecting flange portion 28B is disposed substantially parallel to the side wall 20S in which the branching hole 22 is formed, and is disposed so as to face the second pipe flange 32 of the second pipe 30.

Moreover, the weld nuts 54 are provided at the facing surface of the connecting flange portion 28B, which facing surface faces the outer peripheral surface of the first pipe 20, and are disposed at a predetermined interval in the peripheral direction of the connecting flange portion 28B. Further, the insert-through holes 26 of the first pipe 20 are formed at the regions, that correspond to the weld nuts 54, of the connecting flange portion 28B. Further, the bolts 52 are inserted-through the interiors of the insert-through holes 32A of the second pipe flanges 32 and the interiors of the insert-through holes 26 of the connecting flange portion 28B, and are screwed-together with the weld nuts 54. Due thereto, the second pipe flange 32 is fastened to the connecting flange portion 28B, and the first pipe 20 is connected to the second pipe 30.

In this way, in the third embodiment, the first pipe flanges 28 are formed at the peripheral edge portions of the branching hole 22 and the merging hole 24 of the first pipe 20, and the first pipe flanges 28 are bent so as to bend-back from the peripheral edge portion of the branching hole 22 toward the outer side of the branching hole 22, at the outer side of the first pipe 20. Further, the second pipe flanges 32 of the second pipe 30 are fastened and fixed by the bolts 52 and the weld nuts 54 to the connecting flange portions 28B of the first pipe flanges 28. Therefore, the transfer paths of heat from the first pipe 20 to the second pipe 30 can be made to be long by an amount corresponding to the first pipe flanges 28, as compared with a case in which the second pipe flanges 32 are directly fastened and fixed to the peripheral edge portions of the branching hole 22 and the merging hole 24 of the first pipe 20 as in the modified example of the first embodiment that is shown in FIG. 3. Due thereto, at the portions connecting the first pipe 20 with the second pipe 30, heat of the first pipe 20 being transferred to the second pipe 30 can be suppressed, and boiling of cooling water that is within the heat recovery unit 40 can be suppressed effectively.

Note that, in the third embodiment, there is a structure in which the second pipe flanges 32 are directly connected to the connecting flange portions 28B of the first pipe flanges 28. Instead, in the same way as in the first embodiment, the heat insulating materials 56 may be interposed between the second pipe flanges 32 and the connecting flange portions 28B. Due thereto, at the portions connecting the first pipe 20 with the second pipe 30, heat of the first pipe 20 being transferred to the second pipe 30 can be suppressed more effectively, and boiling of cooling water that is within the heat recovery unit 40 can be suppressed more effectively.

Further, in the first embodiment through the third embodiment, the heat transfer suppressing mechanism 50 is applied to the exhaust heat recovery device 10, 60, 70 that has a parallel structure. However, as shown in FIG. 6, the heat transfer suppressing mechanism 50 may be applied to an exhaust heat recovery device 80 in which the second pipe 30 and the heat recovery unit 40 that are formed in annular shapes are disposed at the outer side of the first pipe 20.

To briefly describe this exhaust heat recovery device 80, at the exhaust heat recovery device 80, only the branching holes 22 are formed in the first pipe 20. Further, the second pipe 30 is formed in an annular shape, and is disposed at the outer side of the first pipe 20. The second pipe 30 is formed in a substantial U-shape that opens toward the first pipe 20 side, as seen in a cross-section viewed from the peripheral direction of the second pipe 30. The second pipe flanges 32 are formed at the opening end portion of the second pipe 30. An inner pipe 82 that is pipe-shaped is disposed at the interior of the second pipe 30. The inner pipe 82 is connected to the first pipe 20 at unillustrated positions. Moreover, the heat recovery unit 40 is formed in an annular shape, and is disposed at the radial direction outer side of the inner pipe 82. In this exhaust heat recovery device 80, the heat transfer suppressing mechanisms 50 of the first embodiment are applied to the portions connecting the second pipe flanges 32 with the first pipe 20. Namely, the heat insulating materials 56 are interposed between the second pipe flanges 32 and the first pipe 20, and the second pipe 30 is fastened to the first pipe 20 by the bolts 52 and the weld nuts 54. Accordingly, at the exhaust heat recovery device 80 as well, an excessive rise in temperature of the second pipe 30 can be suppressed, and boiling of cooling water that is within the heat recovery unit 40 can be suppressed. Note that, in FIG. 6, although not illustrated, the flow path switching valve 18 is provided within the first pipe 20 in the same way as in the exhaust heat recovery device 10 and the like.

Further, in the first embodiment and the third embodiment, the weld nuts 54 are provided at the first pipe 20, and the second pipe 30 is fastened and fixed to the first pipe 20 due to the bolts 52 being screwed-together with the weld nuts 54. Instead, although not illustrated, bolts, that serve as stud bolts and that project-out toward the outer side of the first pipe 20, may be provided at the first pipe 20, and the second pipe 30 may be fastened and fixed to the first pipe 20 by nuts being screwed-together with these bolts.

In the first embodiment through the third embodiment, the heat transfer suppressing mechanism 50 is applied to the portion of the first pipe 20, which is connected to the upstream side end portion 30A of the second pipe 30, and to the portion of the first pipe 20, which is connected to the downstream side end portion 30B of the second pipe 30, respectively. Instead, the heat transfer suppressing mechanism 50 may be applied to one of the portion of the first pipe 20, which is connected to the upstream side end portion 30A of the second pipe 30, and the portion of the first pipe 20, which is connected to the downstream side end portion 30B of the second pipe 30.

Fourth Embodiment

An exhaust heat recovery device 90 of a fourth embodiment is described hereinafter by using FIG. 7. The exhaust heat recovery device 90 of the fourth embodiment is structured similarly to the exhaust heat recovery device 10 of the first embodiment, except for the second pipe 30 and the heat transfer suppressing mechanism 50. A branched-off pipe 34 that serves as a second pipe, and the heat transfer suppressing mechanism 50, of the exhaust heat recovery device 90 are described hereinafter. Note that, in FIG. 7, parts that are structured similarly to the exhaust heat recovery device 10 of the first embodiment are denoted by the same reference numerals.

As shown in FIG. 7, the exhaust heat recovery device 90 has the first pipe 20, the branched-off pipe 34 that is branched-off integrally from the first pipe 20 and is open, and a heat recovery unit 42 that is mounted to the opening of the branched-off pipe 34 so as to close-off the opening. The heat recovery unit 42 has, at the outer peripheral portion of a heat recovery unit main body 43 thereof, a flow path 44 through which cooling water passes. The cooling water circulating paths 16 communicate with and are connected to this flow path 44.

Further, a header plate 46, which is substantially shaped as a tray and structures the heat transfer suppressing mechanism 50, is mounted to the downstream side in the direction (shown by arrow C) of mounting the heat recovery unit 42 to the opening of the branched-off pipe 34. Namely, this is a structure in which in which the heat recovery unit 42 is mounted from the header plate 46 side thereof into the opening of the branched-off pipe 34, and closes-off this opening. Note that an opening end portion 34A side of the branched-off pipe 34 is made to be wide (bent portions 36 are formed) so that the heat recovery unit 42 (the header plate 46) can be mounted to the inner side.

An upstream side opening portion (not shown), through which exhaust gas can flow-in, and a downstream side opening portion (not shown), through which exhaust gas can flow-out, are formed at the header plate 46. Further, the downstream side opening portion of the header plate 46 can be opened and closed by a flow path switching valve 18 that is provided within the first pipe 20.

Namely, the flow path switching valve 18 is disposed at a position corresponding to the central portion of the header plate 46 (the axially central portion of the branched-off pipe 34). As shown by the two-dot chain line in FIG. 2, when the downstream side opening portion of the header plate 46 is closed, there is a normal mode, and the exhaust gas passes-through the first pipe 20.

On the other hand, when the flow path switching valve 18 closes the flow path of the first pipe 20 at the central portion of the header plate 46 (the axially central portion of the branched-off pipe 34), there is the exhaust heat recovery mode, and the exhaust gas passes from the first pipe 20 through the branched-off pipe 34, and flows from the upstream side opening portion of the header plate 46 into the heat recovery unit main body 43.

Then, the exhaust gas, which has flowed-into the heat recovery unit main body 43 from the upstream side opening portion of the header plate 46, is involved in heat exchange with the cooling water that flows through the interior of the heat recovery unit main body 43, and the exhaust gas that has been involved in this heat exchange flows-out from the downstream side opening portion of the header plate 46. Note that the exhaust gas, which has flowed-out from the downstream side opening portion of the header plate 46, passes-through the branched-off pipe 34 and is returned to the first pipe 20.

The heat transfer suppressing mechanism 50 at the exhaust heat recovery device 90 that is structured as described above is provided at the portion connecting the branched-off pipe 34 with the heat recovery unit 42, and suppresses transfer of heat from the branched-off pipe 34 to the heat recovery unit 42. In detail, a flange portion 48, which extends toward the upstream side in the direction of mounting the heat recovery unit 42 to the opening of the branched-off pipe 34, is formed integrally with the outer peripheral portion of the header plate 46 along the entire periphery thereof.

This flange portion 48 contacts, from the outer side, outer wall surfaces 45 of the heat recovery unit main body 43 that structures the flow path 44, and is structured so as to be placed on portions of these outer wall surfaces 45. Further, a distal end portion 48A at the flange portion 48 of the header plate 46, and the opening end portion 34A of the branched-off pipe 34 that is disposed flush with this distal end portion 48A, are both joined by arc welding to the outer wall surfaces 45 (hereinafter, these welded portions are called "welded portions 64").

Therefore, distance L, which is to the welded portion 64 from the bent portion 36 of the branched-off pipe 34 that is disposed further toward the upstream side than the header plate 46, can be set to be long, and a heat transfer path R, which is from the welded portion 64 to the cooling water within the flow path 44 of the heat recovery unit 42 (an end portion 43A that is at the header plate 46 side of the heat recovery unit main body 43), can be set to be long. Due thereto, an excessive rise in temperature of the cooling water that is within the heat recovery unit 42 due to the heat of the branched-off pipe 34 can be suppressed, and boiling of the cooling water can be suppressed.

In particular, because the flange portion 48 of the header plate 46 extends toward the upstream side in the direction of mounting the heat recovery unit 42 to the opening of the branched-off pipe 34, as compared with a structure in which this flange portion 48 does not extend toward the upstream side in the direction of mounting the heat recovery unit 42 to the opening of the branched-off pipe 34, the heat transfer path R from the welded portion 64 to the cooling water within the heat recovery unit 42 can efficiently be set to be long, and boiling of the cooling water that is within the heat recovery unit 42 can be suppressed effectively.

Further, because the welded portions 64 are provided at the outer wall surfaces 45 of the heat recovery unit main body 43 that structures the flow path 44 through which the cooling water passes, the temperature immediately after welding of the welded portions 64 can be reduced by the cooling water. Accordingly, a decrease in the joining strength at the welded portions 64 can be suppressed.

Note that the heat transfer suppressing mechanism 50 of the fourth embodiment (the flange portion 48 of the header plate 46) is not limited to a structure that is joined by arc welding, and, for example, may be a structure that is joined by laser welding in the same way as in the second embodiment. Further, it suffices for the distal end portion 48A of the flange portion 48 of the header plate 46, and the opening end portion 34A of the branched-off pipe 34, to be flush with one another, and they may extend even longer than the illustrated position.

What is claimed is:

1. An exhaust heat recovery device comprising:
   a first pipe through which exhaust gas from an engine flows;
   a second pipe that is branched-off from the first pipe and is open;
   a heat recovery unit that has a header plate, and is mounted to an opening of the second pipe from the header plate side and closes-off the opening, and exchanges heat between the exhaust gas and cooling water that circulates at an interior of the heat recovery unit, and that recovers heat of the exhaust gas; and
   a heat transfer suppressing mechanism that is provided at a portion connecting the second pipe with the heat recovery unit, and that suppresses transfer of heat from the second pipe to the heat recovery unit,
   wherein the heat recovery unit has, at an outer peripheral portion thereof, a flow path through which cooling water passes, the flow path which cooling water circulating paths communicate with and are continuously connected to, the cooling water circulating paths being disposed in parallel to the first pipe, and
   the heat transfer suppressing mechanism is structured to include an outer peripheral portion of the header plate that, together with an opening end portion of the second pipe, is welded to outer wall surfaces that structure the flow path, the header plate has a flange portion that extends toward an upstream side in a direction of mounting the heat recovery unit to the opening of the second pipe, the flange portion being formed integrally with the outer peripheral portion of the header plate along the entire periphery of the header plate, the flange portion contacting from an outer side of the outer wall surfaces and being structured so as to be placed on portions of the outer wall surfaces.

2. The exhaust heat recovery device of claim 1, wherein the outer peripheral portion of the header plate extends toward an upstream side in a direction of mounting the heat recovery unit to the opening of the second pipe.

\* \* \* \* \*